(12) United States Patent
Mitterbacher et al.

(10) Patent No.: US 9,155,144 B2
(45) Date of Patent: Oct. 6, 2015

(54) METHOD AND CIRCUIT ARRANGEMENT FOR OPERATING LIGHT-EMITTING MEANS, WITH BEAT AVOIDANCE

(71) Applicant: TRIDONIC GMBH & CO KG, Dornbirn (AT)

(72) Inventors: Andre Mitterbacher, Dornbirn (AT); Markus Mayrhofer, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 14/368,279

(22) PCT Filed: Dec. 20, 2012

(86) PCT No.: PCT/EP2012/076337
§ 371 (c)(1),
(2) Date: Jun. 23, 2014

(87) PCT Pub. No.: WO2013/092832
PCT Pub. Date: Jun. 27, 2013

(65) Prior Publication Data
US 2014/0368122 A1    Dec. 18, 2014

(30) Foreign Application Priority Data

Dec. 23, 2011  (DE) .......................... 10 2011 089 840
Mar. 9, 2012   (DE) .......................... 10 2012 203 745

(51) Int. Cl.
*H05B 37/02*    (2006.01)
*H05B 33/08*    (2006.01)
(Continued)

(52) U.S. Cl.
CPC ......... *H05B 33/0815* (2013.01); *H02M 1/4225* (2013.01); *H02M 3/156* (2013.01); *H05B 33/0845* (2013.01); *H05B 33/0887* (2013.01)

(58) Field of Classification Search
CPC .......... H05B 33/0815; H05B 33/0845; H05B 33/0887; H05B 33/0803; H05B 33/0824; H05B 33/0842; H05B 33/089; H05B 33/0809; H05B 33/0812; H05B 33/0821; H05B 37/00; H05B 37/02; Y02B 20/346; Y02B 20/186; Y02B 20/348; Y02B 70/1433; H02M 1/42; H02M 2001/4291; H02M 3/157; H02M 3/1582; G05F 1/70; H05K 2201/10106
USPC .............. 315/209 R, 192, 301; 323/266, 205, 323/208; 363/17, 21.18, 79
See application file for complete search history.

(56) References Cited

U.S. PATENT DOCUMENTS 7,646,029 B2 *  1/2010  Mueller et al. .................. 257/84
2011/0043133 A1  2/2011  Van Laanen et al.
(Continued)

FOREIGN PATENT DOCUMENTS

DE    102004051162 A1    4/2006
DE    202009001708 U1    4/2009
(Continued)

Primary Examiner — Vibol Tan
(74) Attorney, Agent, or Firm — Volpe and Koenig, P.C.

(57) ABSTRACT

The invention relates to an operating circuit for illuminants, in particular one or more LED sections (17), comprising an actively clocked PFC circuit (11), which can be supplied by an AC voltage ($U_{AC}$) and optionally also a DC voltage ($U_{DC}$) and the output voltage of which is directly or indirectly supplied through the illuminant (17) to a unit (19) for generating a PWM-modulated current. The operating circuit also has a control unit (16) that detects a residual ripple in the voltage ($U_{PFC}$) in the supply chain before (18a), in (18b) or after (18c) the PFC circuit (11) and causes the frequency of the PWM modulation of the current through the illuminant (17) to be selected as a function of the frequency of the residual ripple.

14 Claims, 2 Drawing Sheets

(51) Int. Cl.
*H02M 1/42* (2007.01)
*H02M 3/156* (2006.01)

(56) References Cited

U.S. PATENT DOCUMENTS

| | | | |
|---|---|---|---|
| 2011/0089846 A1* | 4/2011 | Ido | 315/209 R |
| 2011/0241569 A1* | 10/2011 | Zimmermann et al. | 315/301 |
| 2011/0248640 A1 | 10/2011 | Welten | |
| 2012/0146529 A1* | 6/2012 | Campbell et al. | 315/210 |
| 2013/0134893 A1* | 5/2013 | Zimmermann et al. | 315/224 |
| 2014/0125247 A1* | 5/2014 | Mitterbacher | 315/224 |
| 2014/0252969 A1* | 9/2014 | Wang | 315/200 R |
| 2014/0306616 A1* | 10/2014 | Wu | 315/206 |

FOREIGN PATENT DOCUMENTS

| | | |
|---|---|---|
| DE | 102008057333 A1 | 5/2010 |
| EP | 2302984 A1 | 3/2011 |
| EP | 2503847 A2 | 9/2012 |

* cited by examiner

METHOD AND CIRCUIT ARRANGEMENT FOR OPERATING LIGHT-EMITTING MEANS, WITH BEAT AVOIDANCE

FIELD OF THE INVENTION

The invention relates to a method and a circuit arrangement for operating light-emitting means by means of pulse width modulation. In order to avoid beats in the visible frequency range which result in visible fluctuations in brightness in the case of light-emitting means, in particular LEDs, the discretely or continuously adjustable frequency of the pulse width modulation (PWM) is in this case selected depending on a detected voltage ripple (residual ripple in the supply voltage).

BACKGROUND

Conventionally, a DC voltage signal is generated from a line voltage in order to supply a power to LEDs by means of a power factor correction circuit and a smoothing capacitor. This DC voltage signal is converted by pulse width modulation into a pulse-width-modulated DC voltage signal. A load, for example directly an LED module, or a further LED converter stage is operated by the pulse-width-modulated DC voltage signal. The output signal of the rectifier module in this case has a residual ripple at a frequency of twice the line voltage.

Even if, for example, a DC supply is present for emergency light operation, ripple may arise if the clocking of the PFC circuit is modulated deliberately in order to improve the EMI properties.

Customary frequencies for pulse width modulation are in the range of from 100 Hz to 500 Hz. In particular when the frequency used for the pulse width modulation is close to the frequency of the residual ripple of the DC voltage signal or an integral multiple of this frequency, low-frequency beats occur as a result of demodulation. In the case of an LED module, these beats result in a clearly visible fluctuation in brightness at the frequency of the beat, i.e. at the differential frequency between twice the line frequency or the integral multiple thereof and the frequency of the pulse width modulation.

For example, US 2011/0043133 A1 discloses an operating circuit for operating an LED module which generates a DC voltage signal with a residual ripple by means of power factor correction from an AC voltage. This signal is processed by pulse width modulation and is used for operating the LEDs. In this case, the frequency of the pulse width modulation is set independently of the line frequency. The circuit arrangement disclosed therein is disadvantageous since it can result in beats, as described above.

The present invention is based on the object of providing a method and a circuit arrangement which, independently of the line frequency used, enable operation of light-emitting means without the occurrence of undesirable fluctuations in brightness which are visible to the human eye.

SUMMARY

The fluctuations as a result of the ripple are therefore not corrected, but rather measures are taken to ensure that products of demodulation (beats) do not occur in the frequency range which is easily detectable to the human eye. The maximum sensitivity of the human eye when it comes to fluctuations in brightness is approximately 10 Hz, as is known, with the result that, in accordance with the invention, it is ensured that beats are between the ripple frequency and the PWM frequency in a range of more than 20 Hz, preferably more than 30 Hz, more preferably more than 40 Hz.

An operating circuit according to the invention for light-emitting means, in particular one or more LED strings, has an actively clocked PFC circuit which can be supplied starting from an AC voltage and optionally also a DC voltage, the output voltage of said PFC circuit being supplied directly or indirectly to a unit for generating a PWM-modulated current through the light-emitting means. Furthermore, it has a control unit, which detects a residual ripple in the voltage in the supply chain upstream of, in or downstream of the PFC circuit and initiates that the frequency of the PWM modulation of the current through the light-emitting means is selected depending on the frequency of the residual ripple. Thus, changes in brightness owing to beats can easily be avoided.

Preferably, the control unit determines the frequency of the PWM modulation in such a way that it is an integral multiple of the frequency of the AC voltage, preferably an integral multiple of twice the frequency of the AC voltage. Thus, beats owing to the frequency of the PWM modulation being close to the frequency of the AC voltage can be avoided.

Preferably, the control unit determines the frequency of the PWM modulation in such a way that it is at least 20 Hz, preferably at least 30 Hz, particularly preferably at least 40 Hz removed from a frequency of the clocking of the PFC circuit and integral multiples of the frequency of the clocking of the PFC circuit. Thus, beats owing to the frequency of the PWM modulation being close to the frequency of the clocking of the PFC circuit can be avoided.

Advantageously, the control unit determines the frequency of the PWM modulation in such a way that it is twice the frequency of the AC voltage, preferably an integral multiple of twice the frequency of the AC voltage. Since the AC voltage is generally subjected to full-wave rectification at the input of the operating circuit, the rectified voltage at the input of the operating device thus has twice the frequency of the AC voltage.

Alternatively or in addition, the control unit determines the frequency of the PWM modulation in such a way that it is the frequency of the control loop of the PFC circuit, i.e. the frequency of the clocking of the PFC circuit, preferably an integral multiple of the frequency of the control loop of the PFC circuit. Thus, it is possible to avoid beats owing to the frequency of the PWM modulation being close to the frequency of the AC voltage using alternative frequencies.

The control unit preferably determines the frequency of the PWM modulation in such a way that it is at least 20 Hz removed from integral multiples of the frequency of the AC voltage, preferably from integral multiples of twice the frequency of the AC voltage. It is thus possible to avoid beats owing to the frequency of the PWM modulation being close to twice the frequency of the AC voltage using alternative frequencies.

Particularly advantageously, the control unit is connected to a control input of the PFC circuit, which control input makes it possible to set the frequency of the control loop of the PFC circuit. The control unit then determines the frequency of the PWM modulation and the frequency of the control loop of the PFC circuit in such a way that the frequency of the PWM modulation corresponds to the frequency of the control loop of the PFC circuit and/or the frequency of the PWM modulation and the frequency of the control loop of the PFC circuit are at least 20 Hz removed from integral multiples of the frequency of the AC voltage. It is thus possible to avoid beats particularly effectively.

Preferably, the control unit is further configured to implement detection of an AC voltage and a DC voltage and to thus distinguish between a normal operating mode and an emergency operating mode. It is thus possible to dispense with an additional unit for this detection.

A method according to the invention is used for operating light-emitting means, in particular one or more LED strings. Starting from an AC voltage and optionally also a DC voltage, actively clocked power factor correction is performed. An output voltage of the power factor correction is used directly or indirectly for generating a PWM-modulated current through the light-emitting means. A residual ripple in the voltage in the supply chain upstream of, in or downstream of the power factor correction is detected. The frequency of the PWM modulation of the current through the light-emitting means is in this case selected depending on the frequency of the residual ripple. Thus, changes in brightness owing to beats can be avoided in a simple manner.

BRIEF DESCRIPTION OF THE DRAWINGS

The invention will be described by way of example below with reference to the drawings, in which an advantageous exemplary embodiment of the invention is illustrated and in which.

DETAILED DESCRIPTION OF THE PREFERRED EMBODIMENTS

Figure 1:
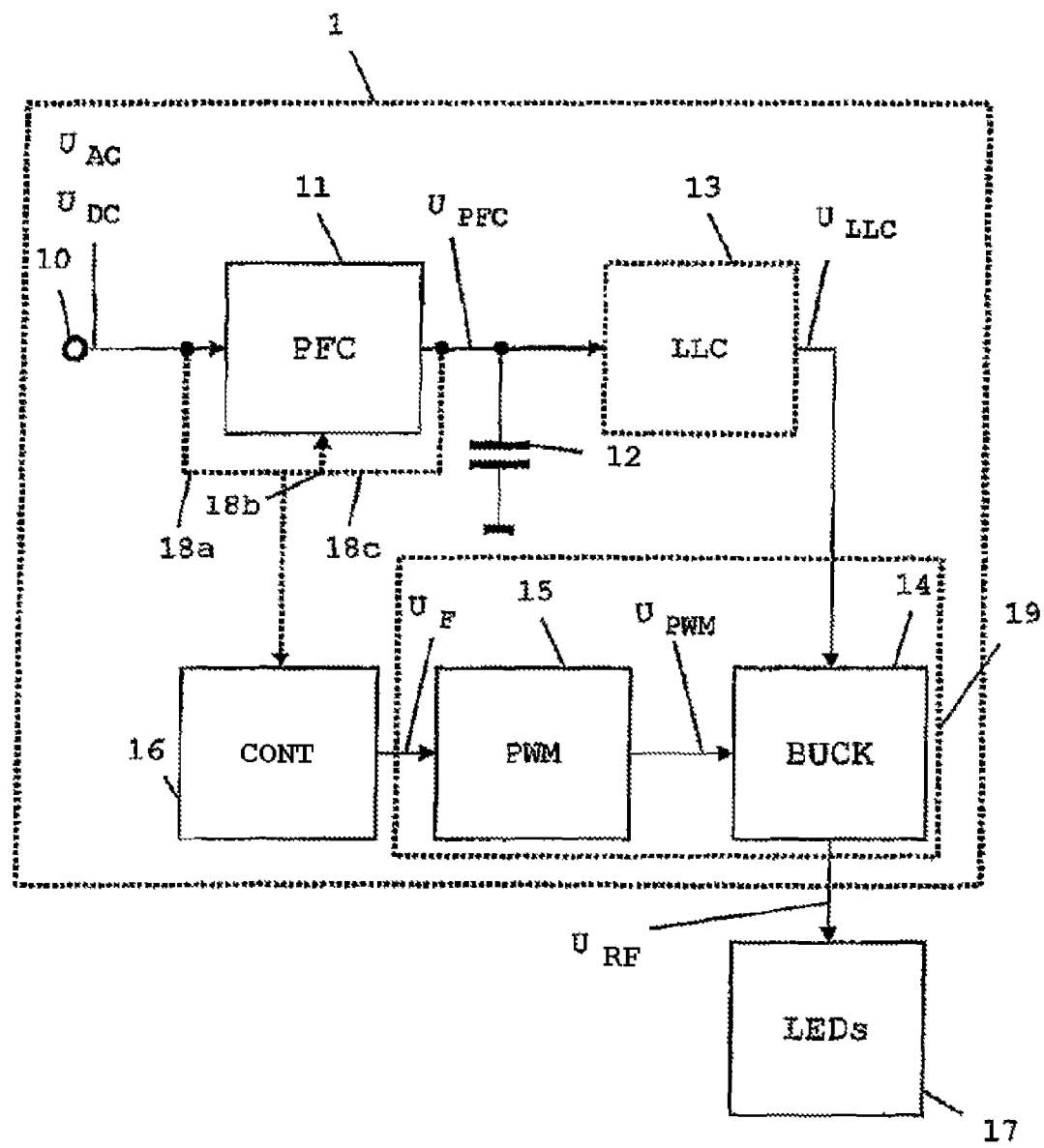
FIG. 1 shows an exemplary embodiment of the circuit arrangement according to the invention.
Figure 2:
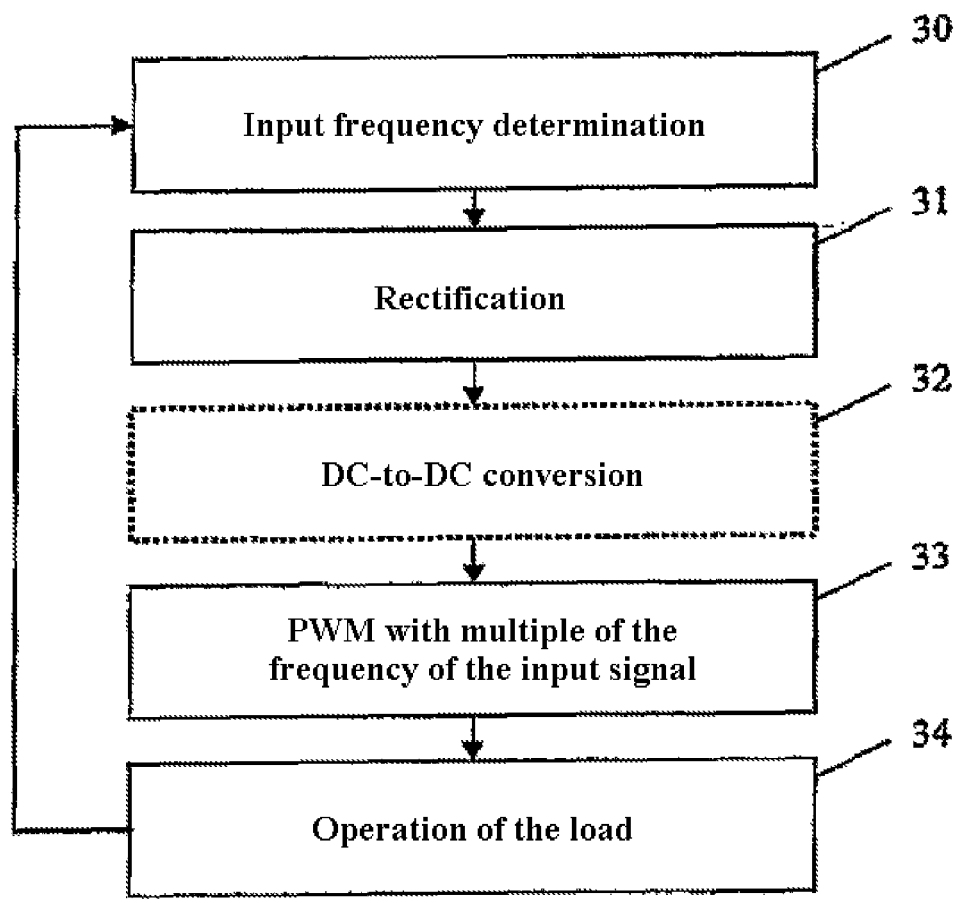
FIG. 2 shows an exemplary embodiment of the method according to the invention.

First, with reference to FIG. 1, details are given of the configuration and mode of operation of an exemplary embodiment of the circuit arrangement according to the invention. Then, FIG. 2 shows in detail the mode of operation of an exemplary embodiment of the method according to the invention. Identical elements have not been illustrated and described repeatedly in similar figures, in part.

FIG. 1 shows an exemplary embodiment of the circuit arrangement according to the invention. An operating circuit 1 has a mains connection 10. The mains connection 10 is used for feeding an AC voltage $U_{AC}$. This does not have to be a line voltage. The feed of a DC voltage $U_{DC}$ during an emergency operating mode is also possible.

The operating circuit 1 furthermore has a PFC circuit 11, a smoothing capacitor 12, a DC-to-DC converter 13, a pulse width modulator module 19 and a control unit 16. The PFC circuit 11 is in this case a power factor correction circuit. It is connected to the mains connection 10. The input of the PFC circuit 11 is connected to the mains connection 10 via a line filter and a rectifier bridge. The output of the PFC circuit 11 is connected to the smoothing capacitor 12, which in turn is connected to ground. Furthermore, the output of the PFC circuit 11 is connected to an input of the DC-to-DC converter 13. An output of this converter 13 is connected to the pulse width modulator module 19.

In this case, the pulse width modulator module 19 comprises a buck converter 14 and a pulse width modulator 15 and is a unit for pulse width modulation of the current through the light-emitting means 17. The DC-to-DC converter 13 is in this case connected to the buck converter 14. The pulse width modulator 15 is likewise connected to the buck converter 14. The control unit 16 is furthermore connected to the pulse width modulator 15 of the pulse width modulator module 19. Furthermore, the control unit 16 is connected to the PFC circuit 11. In this case, the connection 18a is performed either to the input of the PFC circuit 11 or the connection 18b is performed directly to the PFC circuit 11 or the connection 18c is performed to the output of the PFC circuit 11. The buck converter 14 of the pulse width modulator module 19 is in this case connected to a load, in this case an LED module 17.

The frequency of the pulse width modulator 15 is in this case adjustable continuously or in discrete increments.

In addition, optionally the duty factor of the pulse width modulator 15 can be adjustable.

Alternatively or in addition, the amplitude of the light-emitting means current during the on times of a PWM pulse can be adjustable.

An AC voltage $U_{AC}$, preferably a line voltage, is fed to the mains connection 10. The PFC circuit 11 passes on individual segments of the AC voltage $U_{AC}$ from each wave at its output and rectifies said segments. If a DC voltage $U_{DC}$ is connected instead in an emergency operating mode, the PFC circuit 11 passes on individual segments of this signal $U_{DC}$. The smoothing capacitor 12 smoothes the resultant voltage $U_{PFC}$. This resultant voltage $U_{PFC}$ is in this case a DC voltage with a residual ripple. In this case, the residual ripple has twice the frequency of the AC voltage $U_{AC}$ since it is a rectified AC voltage. In addition, the residual ripple can have a frequency which corresponds to the frequency of the control loop of the power factor correction. The control loop of the PFC circuit 11 (power factor correction) generally has a low-frequency characteristic in order to enable a current consumption which is as sinusoidal as possible at an output voltage which is as constant as possible.

The rectified AC voltage $U_{PFC}$ is supplied to the DC-to-DC converter 13. Said DC-to-DC converter 13 converts the fed DC voltage $U_{PFC}$ into a DC voltage with a reduced voltage $U_{LLC}$. Depending on the load, a voltage increase by the DC-to-DC converter 13 is also conceivable. The resultant DC voltage $U_{LLC}$ is supplied to the pulse width modulator module 19. In this case, it is supplied to the buck converter 14 of the pulse width modulator module 19. At the same time, a pulse width modulation signal $U_{PWM}$ is supplied by the pulse width modulator 15 to the buck converter 14. The pulse width modulation signal $U_{PWM}$ is a pulsed DC voltage. The voltage of the pulse width modulation signal $U_{PWM}$ is preferably much lower than the voltage $U_{LLC}$. The power which is supplied to the load, in this case the LED module 17, can be adjusted by means of the duty factor of the pulse width modulation signal $U_{PWM}$.

The buck converter 14 is only a possible example of a PWM module which effects PWM modulation of the current through the light-emitting means 17 in order to adjust the power of the light-emitting means 17 and therefore to influence the brightness, for example a dimming level, of the light-emitting means 17. Instead of the buck converter 14, it is also possible to use other on-off controller topologies for driving the light-emitting means 17. The pulse width modulation signal $U_{PWM}$ can also be supplied to the buck converter 14 indirectly as information, wherein the buck converter 14 drives the light-emitting means 17, for example the LED module, with the pulse width modulation signal $U_{PWM}$ depending on this information. The buck converter 14 preferably operates with radiofrequency clocking, wherein this clocking is performed only when a high level of the pulse width modulation signal $U_{PWM}$ is applied (i.e. during the on phase of the pulse width modulation signal $U_{PWM}$).

The buck converter 14 as PWM module can, during its active phase (i.e. during the on phase of the pulse width modulation signal $U_{PWM}$), adjust the current to a predetermined value owing to a control loop. Said buck converter has at least one switching element with radiofrequency clocking and one energy store, wherein the energy store is charged and discharged permanently in a targeted manner by the switching element with radiofrequency clocking and, as a result, outputs its energy in a controlled manner to the light-emitting means 17.

The frequency of the pulse width modulation signal $U_{PWM}$ is in this case set by the control unit 16. The control unit 16 determines the frequency of the AC voltage $U_{AC}$ or the frequency of the residual ripple of the rectified signal $U_{PFC}$ and, on the basis of this, provides a signal $U_F$ to the pulse width modulator 15, which signal indicates the frequency determined. The pulse width modulator 15 generates the pulse width modulation signal $U_{PWM}$ on the basis of the signal $U_F$. In this case, the pulse width modulation signal $U_{PWM}$ is set as an integral multiple of the frequency of the AC voltage, preferably as an integral multiple of twice the frequency of the AC voltage $U_{AC}$.

If the control unit 16 is connected to the power factor correction circuit 11, indirect detection of the frequency of the AC voltage is possible. Thus, detection via a parameter of the power factor correction takes place. For example, a time $t_{off}$ of the power factor correction can be used as an indicator for the frequency or twice the frequency.

Irrespective of the frequency of the signal $U_{AC}$, this means that there are no low-frequency mixed products in the buck converter 14. Visible fluctuations in brightness therefore do not occur.

Furthermore, the control unit 16 can alternatively/additionally determine the frequency of the control loop of the power factor correction by means of the PFC circuit 11 if the connection 18b is present. In this case, the control unit 16 determines the frequency of the signal $U_F$ in such a way that it is likewise not close to the frequency of the control loop of the PFC circuit 11. That is to say that the frequency of the signal $U_F$ is selected in such a way that it is additionally at least 20 Hz, preferably at least 30 Hz, particularly preferably at least 40 Hz removed from the frequency of the control loop of the PFC circuit.

Since the signal $U_{PFC}$ can additionally have residual ripple of the power factor correction, in addition to the residual ripple of the mains signal, visible fluctuations in brightness can thus be avoided even more effectively.

Alternatively, the control unit 16 can contain a switch via which a user sets the line frequency present, instead of detection of an actual frequency. In this case, the control unit 16 does not have a connection to the PFC circuit 11. In particular in operating circuits for light-emitting means, generally a possibility for operation at 50 Hz and 60 Hz line voltage is generally sufficient. The control unit 16 therefore contains a switch, with which the operating frequency can be switched over between 50 Hz and 60 Hz. This preferably results in a pulse width modulation frequency of a multiple of 100 Hz or a multiple of 120 Hz. In addition, the frequency range of the control loop of the PFC circuit can also be avoided here.

In a preferred embodiment, the control unit 16 is in particular configured to detect input frequencies of 50 Hz or 60 Hz or frequencies of the residual ripple of 100 Hz or 120 Hz. Thus, the control unit 16 can have a very simple embodiment since it is only necessary to distinguish between these fixed values. This can take place, for example, by resonators tuned to these frequencies within the control unit 16.

Furthermore, current regulation of the load is possible by means of a linear regulator connected in series with the load.

It is known from the prior art to modulate a frequency of the radiofrequency clocking of the PFC circuit in order to improve the electromagnetic interference properties, for example when a DC voltage is present at the mains connection 10, for example in the case of an emergency light operation. In order to avoid low-frequency beats between the frequency of the pulse width modulation or else the harmonic thereof and the frequency of the radiofrequency clocking of the PFC circuit, the control unit 16 is furthermore configured, in an advantageous exemplary embodiment, to detect and process the frequency of the radiofrequency clocking of the PFC circuit. The control unit 16 thus determines the frequency of the pulse width modulation as an integral divisor of the frequency of the radiofrequency clocking of the PFC circuit. In this case, values at which integral multiples of the frequency of the pulse width modulation would be at a frequency of the radiofrequency clocking of the PFC circuit 11 are avoided.

In a further exemplary embodiment, the control unit 16 is furthermore configured to detect and process the frequency of the rectified input voltage. The control unit 16 therefore determines the frequency of the pulse width modulation as an integral multiple of the input frequency. In this case, values which are close to integral multiples of the frequency of the clocking of the PFC circuit 11 are avoided.

Alternatively, it is possible to set the frequency of the pulse width modulation to the frequency of the control loop of the PFC circuit or an integral multiple of this frequency and therefore to follow the modulation of the frequency of the clocking of the PFC circuit. In this case, however, care should be taken to ensure that the selected frequency for the pulse width modulation is not close to an integral multiple of the line frequency or to an integral multiple of the residual ripple. In this case, an interval of at least 20 Hz with respect to an integral multiple of the input frequency is maintained.

In an alternative exemplary embodiment, the control unit 16 controls not only the frequency of the pulse width modulation 15, but also controls the frequency of the radiofrequency clocking and/or the control loop of the PFC circuit. Thus, optimum tuning and avoidance of any beats are possible.

Instead of a single control unit 16 which controls the frequency of the clocking of the PFC circuit 11 and the frequency of the pulse width modulation, it is also possible for this to be split into two units. A PFC control device then controls the power factor correction. Said PFC control device is connected to the control unit 16 via a synchronization line. There is interchange between the two devices via the synchronization line and said devices thus determine suitable frequencies.

In an alternative embodiment, the control unit 16 can at the same time be used for detecting DC voltage or AC voltage as input signal. The control unit 16 then is additionally used for detection of an emergency operating mode.

FIG. 2 shows an exemplary embodiment of the method according to the invention. In a first step 30, the frequency of the input signal is determined. Alternatively, this step can also be performed simultaneously with or after the second step 31. If step 30 takes place simultaneously with or after step 31, the frequency of the residual ripple of the signal is determined instead of the input frequency.

In a second step 31, rectification of the input signal takes place. Within this step 31, the rectified signal can be smoothed furthermore. The resultant signal has a residual ripple, however. Instead of the first step 30, the frequency of this residual ripple can then now also be determined.

In an optional third step 32, DC-to-DC conversion takes place. That is to say that the DC voltage resulting from the rectification and smoothing is decreased or increased in terms of its level. In the example in FIG. 1, step 31 is performed in the PFC circuit block 11. Step 32 takes place in the DC-to-DC converter block 13, as shown in FIG. 1. It is also possible for the two steps 31 and 32 to be combined and implemented within one block, for example by means of an isolating flyback converter with a power factor correction functionality.

In a fourth step 33, pulse width modulation of the resultant DC voltage takes place. This step 33 is performed by means of the buck converter 14 in FIG. 1. The pulse width modulation is in this case at a frequency which corresponds to a multiple of the determined frequency of the input signal. Preferably, the pulse width modulation is performed at an integral multiple of twice the frequency of the input signal. If the frequency of the residual ripple has previously been determined, the pulse width modulation is performed at an integral multiple of the frequency of the residual ripple. Optionally, the frequency of the pulse width modulation is in this case selected in such a way that it is additionally or alternatively at least 20 Hz, preferably at least 30 Hz, particularly preferably at least 40 Hz removed from the frequency of the control loop of the power factor correction. In this step, in addition the power supplied to the load can be determined by the duty factor of the pulse width modulation.

In a fifth step 34, the load is operated with the pulse-width-modulated signal. After the fifth step 34, the procedure continues with the first step 30. This method is repeated as often as desired.

The invention is not restricted to the exemplary embodiment illustrated. As already mentioned, different loads can be used. Furthermore, it is possible to dispense with the DC-to-DC converter 13 or to integrate said DC-to-DC converter in the PFC circuit block 11. Direct pulse width modulation without any additional buck converter 14 or by means of a different on-off controller topology is also conceivable. Direct pulse width modulation can be enabled by the DC-to-DC converter 13 by virtue of said DC-to-DC converter only being active during the on phase of the pulse width modulation signal $U_{PWM}$. All of the above-described features or features shown in the figures can be combined as desired with one another in an advantageous manner within the scope of the invention.

What is claimed is:

1. An operating circuit for light-emitting means comprising:
    an actively clocked power factor correction (PFC) circuit (11) which can be supplied originating from an AC voltage ($U_{AC}$) and optionally also a DC voltage ($U_{DC}$), the output voltage ($U_{PFC}$) of said PFC circuit being supplied directly or indirectly to a unit (19) for generating a pulse width modulation (PWM)-modulated current through the light-emitting means (17),
    a control unit (16), which detects a residual ripple in the voltage ($U_{PFC}$) in the supply chain upstream of, in or downstream of the PFC circuit (11) and initiates that a frequency of the PWM modulation of the current through the light-emitting means (17) is selected depending on a frequency of the residual ripple, wherein the control unit (16) is further configured to implement detection of an AC voltage (UAC) and a DC voltage (UDC) and to thereby distinguish between a normal operating mode and an emergency operating mode.

2. The operating circuit as claimed in claim 1, wherein the control unit (16) determines the frequency of the PWM modulation such that the frequency of the PWM modulation is an integral multiple of the frequency of the AC voltage ($U_{AC}$).

3. The operating circuit as claimed in claim 2, wherein the control unit (16) determines the frequency of the PWM modulation such that the frequency of the PWM modulation differs by at least 20 Hz from a frequency of a control loop of the PFC circuit and integral multiples of the frequency of the control loop of the PFC circuit (11).

4. The operating circuit as claimed in claim 1, wherein the control unit (16) determines the frequency of the PWM such that the frequency of the PWM modulation is the frequency of a control loop of the PFC circuit (11).

5. The operating circuit as claimed in claim 4, wherein the control unit (16) determines the frequency of the PWM modulation such that the frequency of the PWM modulation differs by at least 20 Hz from integral multiples of the frequency of the AC voltage ($U_{AC}$).

6. The operating circuit as claimed in claim 1, wherein the control unit (16) is connected to a control input of the PFC circuit (11), said control input makes it possible to set the frequency of a control loop of the PFC circuit (11), the control unit (16) determines the frequency of the PWM modulation and the frequency of the control loop of the PFC circuit (11) such that the frequency of the PWM modulation corresponds to the frequency of the control loop of the PFC circuit (11) and/or the frequency of the PWM modulation and the frequency of the control loop of the PFC circuit (11) differs by at least 20 Hz from integral multiples of the frequency of the AC voltage ($U_{AC}$).

7. An operating circuit for light-emitting means comprising:
    an actively clocked power factor correction (PFC) circuit (11) which is suppliable originating from an AC voltage ($U_{AC}$) and optionally also a DC voltage ($U_{DC}$) and whose output voltage ($U_{PFC}$) is supplied directly or indirectly to a unit (19) for generating a pulse width modulation (PWM)-modulated current through the light-emitting means (17),
    a control unit (16), which detects a residual ripple in the voltage ($U_{PFC}$) in the supply chain upstream of, in or downstream of the PFC circuit (11) and is configured in such a way that a PWM frequency and a frequency of the residual ripple do not generate any beats in the range of below 20 Hz, wherein the control unit (16) is further configured to implement detection of an AC voltage (UAC) and a DC voltage (UDC) and to thereby distinguish between a normal operating mode and an emergency operating mode.

8. A system comprising an operating circuit as claimed in claim 1 and a light-emitting means load (17).

9. A method for operating light-emitting means, the method comprising:
    performing actively clocked power factor correction (PFC) originating from an AC voltage ($U_{AC}$) or a DC voltage ($U_{DC}$),
    using an output voltage ($U_{PFC}$) of the power factor correction directly or indirectly for generating a pulse width modulation (PWM)-modulated current through the light-emitting means (17),
    detecting a residual ripple in the voltage ($U_{PFC}$) in the supply chain upstream of, in or downstream of the power factor correction, and
    selecting a frequency of the PWM modulation of the current through the light-emitting means (17) depending on a frequency of the residual ripple, wherein detection of an AC voltage (UAC) and a DC voltage (UDC) is implemented, and a distinction is thereby drawn between a normal operating mode and an emergency operating mode.

10. The method as claimed in claim 9, wherein the frequency of the PWM modulation is determined such that the frequency is an integral multiple of the frequency of the AC voltage ($U_{AC}$).

11. The method as claimed in claim 10, wherein the frequency of the PWM modulation is determined such that the frequency differs by at least 20 Hz from a frequency of the control loop of the power factor correction and integral multiples of the frequency of the control loop of the power factor correction.

12. The method as claimed in claim 9, wherein the frequency of the PWM modulation is determined such that the frequency is the frequency of the clocking of the power factor correction.

13. The method as claimed in claim 12, wherein the frequency of the PWM modulation is determined such that the frequency differs by at least 20 Hz from integral multiples of the frequency of the AC voltage ($U_{AC}$).

14. The method as claimed in claim 9, wherein the frequency of the PWM modulation and the frequency of the clocking of the power factor correction are determined such that the frequency of the PWM modulation corresponds to the frequency of the control loop of the power factor correction and/or the frequency of the PWM modulation and the frequency of the control loop of the power factor correction differs by at least 20 Hz from integral multiples of the frequency of the AC voltage ($U_{AC}$).

\* \* \* \* \*